United States Patent
Zhang et al.

(10) Patent No.: US 12,338,136 B2
(45) Date of Patent: Jun. 24, 2025

(54) POSITIVE ELECTRODE MATERIAL, PREPARATION METHOD THEREFOR, AND APPLICATION THEREOF

(71) Applicant: BEIJING EASPRING MATERIAL TECHNOLOGY CO., LTD., Beijing (CN)

(72) Inventors: Hang Zhang, Beijing (CN); Yafei Liu, Beijing (CN); Yuqiang Jin, Beijing (CN); Xuequan Zhang, Beijing (CN); Yanbin Chen, Beijing (CN)

(73) Assignee: Beijing Easpring Material Technology Co., Ltd., Beijing (CN)

( * ) Notice: Subject to any disclaimer, the term of this patent is extended or adjusted under 35 U.S.C. 154(b) by 0 days.

(21) Appl. No.: 18/400,498

(22) Filed: Dec. 29, 2023

(65) Prior Publication Data

US 2024/0132371 A1   Apr. 25, 2024
US 2024/0228322 A9   Jul. 11, 2024

Related U.S. Application Data

(63) Continuation of application No. PCT/CN2023/094331, filed on May 15, 2023.

(30) Foreign Application Priority Data

Jun. 30, 2022 (CN) .......................... 202210769645.6

(51) Int. Cl.
*C01G 53/42* (2025.01)
*H01M 10/0525* (2010.01)

(52) U.S. Cl.
CPC ........ *C01G 53/42* (2013.01); *H01M 10/0525* (2013.01); *C01P 2004/03* (2013.01);
(Continued)

(58) Field of Classification Search
CPC ..................... C01G 53/42; H01M 10/0525; C01P 2004/03; C01P 2004/61; C01P 2004/62;
(Continued)

(56) References Cited

U.S. PATENT DOCUMENTS

| | | |
|---|---|---|
| 2017/0222221 A1 | 8/2017 | Park et al. |
| 2019/0020023 A1 | 1/2019 | Yokoyama et al. |
| 2023/0317941 A1 | 10/2023 | Maekawa et al. |
| 2023/0391635 A1 | 12/2023 | Li et al. |

FOREIGN PATENT DOCUMENTS

| | | |
|---|---|---|
| CN | 104993122 A | 10/2015 |
| CN | 107112515 A | 8/2017 |

(Continued)

*Primary Examiner* — Daniel S Gatewood
(74) *Attorney, Agent, or Firm* — Sughrue Mion, PLLC

(57) ABSTRACT

A positive electrode material, a preparation method therefor, and an application thereof are disclosed. The cathode material is composed of secondary particles agglomerated by primary particles; wherein individual secondary particle contains an inner core structure, a middle layer, and a shell layer, in this order, along a direction from a center to a surface of the secondary particle; wherein the middle layer is distributed in a circular ring shape; and wherein the secondary particle has a structure of close packing of an inner core structure, loose and porous middle layer, and close packing of the shell layer.

15 Claims, 2 Drawing Sheets

(52) U.S. Cl.
CPC ...... *C01P 2004/61* (2013.01); *C01P 2004/62* (2013.01); *C01P 2004/84* (2013.01); *C01P 2006/11* (2013.01); *C01P 2006/16* (2013.01); *C01P 2006/40* (2013.01)

(58) Field of Classification Search
CPC .............. C01P 2004/84; C01P 2006/11; C01P 2006/16; C01P 2006/40
See application file for complete search history.

(56) References Cited

FOREIGN PATENT DOCUMENTS

| | | | |
|---|---|---|---|
| CN | 108199027 A | 6/2018 | |
| CN | 108751265 A | 11/2018 | |
| CN | 110817976 A | 2/2020 | |
| CN | 111293305 A | 6/2020 | |
| CN | 112186158 A | 1/2021 | |
| CN | 112652751 A | 4/2021 | |
| CN | 113161529 A * | 7/2021 | ............. C01G 53/42 |
| CN | 113823779 A | 12/2021 | |
| CN | 114195200 A | 3/2022 | |
| CN | 114314695 A * | 4/2022 | |
| CN | 114573043 A | 6/2022 | |
| CN | 114583141 A | 6/2022 | |
| CN | 115072802 A | 9/2022 | |
| JP | 2014-149962 A | 8/2014 | |
| JP | 2017-84628 A | 5/2017 | |
| WO | WO-2016204563 A1 * | 12/2016 | ........... C01G 53/006 |
| WO | 2017/073682 A1 | 5/2017 | |
| WO | 2022/050158 A1 | 3/2022 | |

* cited by examiner

POSITIVE ELECTRODE MATERIAL, PREPARATION METHOD THEREFOR, AND APPLICATION THEREOF

CROSS-REFERENCE TO RELATED APPLICATIONS

The application is a Bypass Continuation of PCT/CN2023/094331 filed May 15, 2023, which claims benefits of the Chinese Application No. 202210769645.6 filed on Jun. 30, 2022, entitled "CATHODE MATERIAL AND PREPARATION METHOD AND USE THEREOF", the content of which is entirely incorporated herein by reference.

FIELD

The present disclosure relates to the field of lithium-ion batteries, in particular to a cathode material and a preparation method and use thereof.

BACKGROUND

The lamellar ternary cathode material, including lithium Nickel Cobalt Manganate (NCM), lithium Nickel Cobalt Aluminate (NCA), and modified materials thereof, is currently the primary choice for the cathode material of lithium-ion battery. Due to the explosive growth of lithium-ion battery-related industries, the supply of raw materials corresponding to the ternary cathode material has increasingly tight, causing the rising price of raw materials, and continuously passing on the price pressure to the downstream, especially with the most prominent price hike of cobalt raw materials, together with the influence of other factors such as the unstable political situation of the key export countries of cobalt ore, child labor problem, and the potential risks of cobalt elements on human health, environmental pollution, and other aspects, thus the development of the cobalt-free cathode materials has become a trend in the industry.

Cobalt element in the ternary systems, mainly serves to stabilize the material structure and improve the diffusion of the lithium-ion bulk phase, is an important safeguard for capacity performance, rate capability, and cycle stability of the ternary materials. According to the existing academic studies, when cobalt element is removed from a lamellar ternary system, the lamellar cobalt-free materials, influenced by the degradation of lithium diffusion kinetics, generally exhibit a low capacity, a low first efficiency, and other defects, the materials cannot meet the use requirements.

One way to improve the problem is to increase the charge cut-off voltage of the cobalt-free lamellar material to exert sufficient capacity, for instance, the research group of Professor Sun Yangkook of the Hanyang University in South Korea has tested the electrical properties of cobalt-free $LiNi_{0.9}Mn_{0.1}O_2$ material with the charge cut-off voltages of 4.3V and 4.4V, respectively, and discovered that the capacity performance of the material with the cut-off voltage of 4.4V is comparable to that of the NCM material containing the same Ni content, but there is a clear capacity gap for the material with the cut-off voltage of 4.3V.

The lithium-ion de-intercalation can be guaranteed to some extent under the high voltage use condition, which also causes safety risks and problems such as increased side reaction of the electrolyte, and further surface treatment is required. CN112186158A aims to solve problems such as poor first charge-discharge efficiency and low capacity for cobalt-free high nickel materials, and forms a composite carbon coating layer on the surface of the cobalt-free single crystal cathode material with a particle size of 3-5 μm, and select graphene as the composite carbon, such that the ionic conductivity of the cobalt-free cathode material can be effectively improved, the cathode composite material can also effectively isolate an electrolyte, side reactions are reduced, and the first charge-discharge capacity of the material is improved. However, the scheme requires an additional graphene coating process, thereby increasing the production cost.

The agglomeration material exhibits the advantages that the primary particles have small particle size, and a certain proportion of pores are present inside the secondary particles, the advantages are more conducive to ion exchange between the agglomeration material and the electrolyte and ensuring exertion of the capacity and rate performance. CN108199027A proposes an agglomerated cobalt-free cathode material and a synthesis method thereof. The doping of the niobium element is introduced during the sintering process, such that there is a large improvement in the high-rate discharge capacity and cycle stability of the material, but the charge-discharge capacity under the low rate is not improved.

SUMMARY

The present disclosure aims to overcome the problems in the prior art that the cathode material, especially the lamellar cobalt-free cathode material has the low capacity and first efficiency, and provides a cathode material and a preparation method and use thereof, wherein the secondary particle sequentially comprises an inner core structure, a middle layer and a shell layer along the direction from the center to the surface of the secondary particle; the middle layer is distributed in a circular ring shape, and the inner radius of the circular ring and the radius of the secondary particles satisfy the specific relation, the secondary particle has a structure of close packing of an inner core structure, loose and porous middle layer, and close packing of a shell layer; the middle layer exhibits a reticulate loose and porous structure; the cathode material with the specific structure has high tap density, so that the lithium ion battery containing the cathode material has high first charge-discharge capacity, first efficiency, rate capability, and high capacity retention rate.

In order to achieve the above objects, the first aspect of the present disclosure provides a cathode material, wherein the cathode material is composed of secondary particles agglomerated by primary particles; the secondary particle sequentially comprises an inner core structure, a middle layer and a shell layer along the direction from the center to the surface of the secondary particle; the middle layer is distributed in a circular ring shape, and the inner radius r1 of the circular ring and the radius R of the secondary particles satisfy the following relation:

r1/R is more than 0.35 and less than 1;

the secondary particle has a structure of close packing of an inner core structure, loose and porous middle layer, and close packing of a shell layer;

the porosity of the middle layer is greater than or equal to 20%;

the average pore diameter of the middle layer is less than or equal to 1 μm.

The second aspect of the present disclosure provides a method for preparing the cathode material comprising the following steps:

(1) mixing a nickel salt, an optional M salt, and an optional M' element-containing compound with a solvent to prepare a mixed salt solution, preparing a precipitant solution with a precipitant, and preparing a complexing agent solution with a complexing agent;
(2) introducing the mixed salt solution into a reaction kettle containing the precipitant solution and the complexing agent solution to carry out a co-precipitation reaction, in the presence of a protective atmosphere; the co-precipitation reaction comprising the following steps:
(2-1) controlling the temperature of the reaction system to be T1, carrying out a first-stage co-precipitation reaction until the median particle diameter $D_{50}$ of the co-precipitated particles reaches D1, then stopping the introduction of the mixed salt solution;
(2-2) controlling the temperature of the reaction system to be T2, continuously introducing the mixed salt solution to perform a second-stage co-precipitation reaction until the median particle diameter $D_{50}$ of the co-precipitated particles reaches D2, then stopping the introduction of the mixed salt solution;
(2-3) controlling the temperature of the reaction system to be T3, continuously introducing the mixed salt solution to perform a third-stage co-precipitation reaction until the median particle diameter $D_{50}$ of the co-precipitated particles reaches D3, then stopping the introduction of the
(2-4) aging, separating, washing, and drying the co-precipitation slurry obtained in step (2-3) to obtain a cathode material precursor;
(3) blending a lithium source, the cathode material precursor, and an optional M' element-containing compound to obtain a mixture, sintering the mixture in the presence of an oxygen-containing atmosphere, then cooling, crushing, sieving the sintered product and removing iron thereof to prepare a cathode material; wherein T1>T2, 0.35<D1/D3<1.

The third aspect of the present disclosure provides a cathode material produced with the aforementioned preparation method.

The fourth aspect of the present disclosure provides a use of the aforementioned cathode material in the lithium-ion battery.

Due to the technical scheme, the cathode material of the present disclosure, and the preparation method and the use thereof produce the following beneficial effects:

The cathode material provided by the present disclosure is composed of secondary particles agglomerated by primary particles; the secondary particle sequentially comprises an inner core structure, a middle layer, and a shell layer along the direction from the center to the surface of the secondary particle; the middle layer exhibits a reticulate loose and porous structure and is distributed in a circular ring shape, and the inner radius of the circular ring and the radius of the secondary particles satisfy the specific relation, the cathode material with the specific structure has high tap density so that the lithium-ion battery containing the cathode material has high first charge-discharge capacity, first efficiency, rate capability, and high capacity retention rate.

Further, the cathode material provided by the present disclosure has a structure of close packing of an inner core structure, loose and porous middle layer, and close packing of a shell layer, so that the first charge-discharge capacity, first efficiency, rate capability and capacity retention rate of the lithium-ion battery containing the cathode material are further improved.

Furthermore, the middle layer of the cathode material in the present disclosure exhibits a reticulate loose and porous structure, and the middle layer is distributed in a circular ring shape, the width (r2−r1) of the circular ring along the radial direction is appropriate, and the porosity and the pore size of the loose and porous structure ensure that the electrolyte is sufficiently infiltrated, which is conducive to ion exchange, shortening the lithium-ion transmission path and reducing electrode polarization, such that the volume change and the structural stress of secondary particles in the lithium de-intercalation process can be buffered while realizing exertion of the high-capacity and excellent rate capability, the structural stability of secondary particles is maintained, and the cycle life is prolonged.

In the method for preparing the cathode material of the present disclosure, the temperature of the co-precipitation reaction in the growth stage of the precursor and the particle size of co-precipitation particles can be adjusted to ensure that the secondary particles of the precursor have different degrees of crystallinity at different thicknesses, so that the secondary particles of the cathode material obtained from sintering the precursor may sequentially comprise an inner core structure, a middle layer and a shell layer along the direction from the center to the surface of the secondary particle, and the middle layer is distributed in a circular ring shape, and the inner radius of the circular ring and the radius R of the secondary particles satisfy the specific relation, and the secondary particles of the cathode material have different degrees of close packing at different thicknesses.

Further, in the method preparing the cathode material provided by the present disclosure, the structural regulation and control of the cathode material are implemented by controlling the temperatures of co-precipitation reactions and the particle sizes of co-precipitation particles, the process can be easily implemented, the operation is simple and convenient, the controllability of temperature adjustment is high, the stability is excellent, the preparation process can be easily controlled by using the growth particle size of a precursor as monitoring means, the method is suitable for large-scale production, and the existing precursor production equipment can be directly used for implementation.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The first aspect of the present disclosure provides a cathode material, wherein the cathode material is composed of secondary particles agglomerated by primary particles; the secondary particle sequentially comprises an inner core structure, a middle layer, and a shell layer along the direction from the center to the surface of the secondary particle; the middle layer is distributed in a circular ring shape, and the inner radius r1 of the circular ring and the radius R of the secondary particles satisfy the following relation:

r1/R is more than 0.35 and less than 1;

the secondary particle has a structure of close packing of an inner core structure, loose and porous middle layer, and close packing of a shell layer;

the porosity of the middle layer is greater than or equal to 20%;

the average pore diameter of the middle layer is less than or equal to 1 μm.

Figure 1:
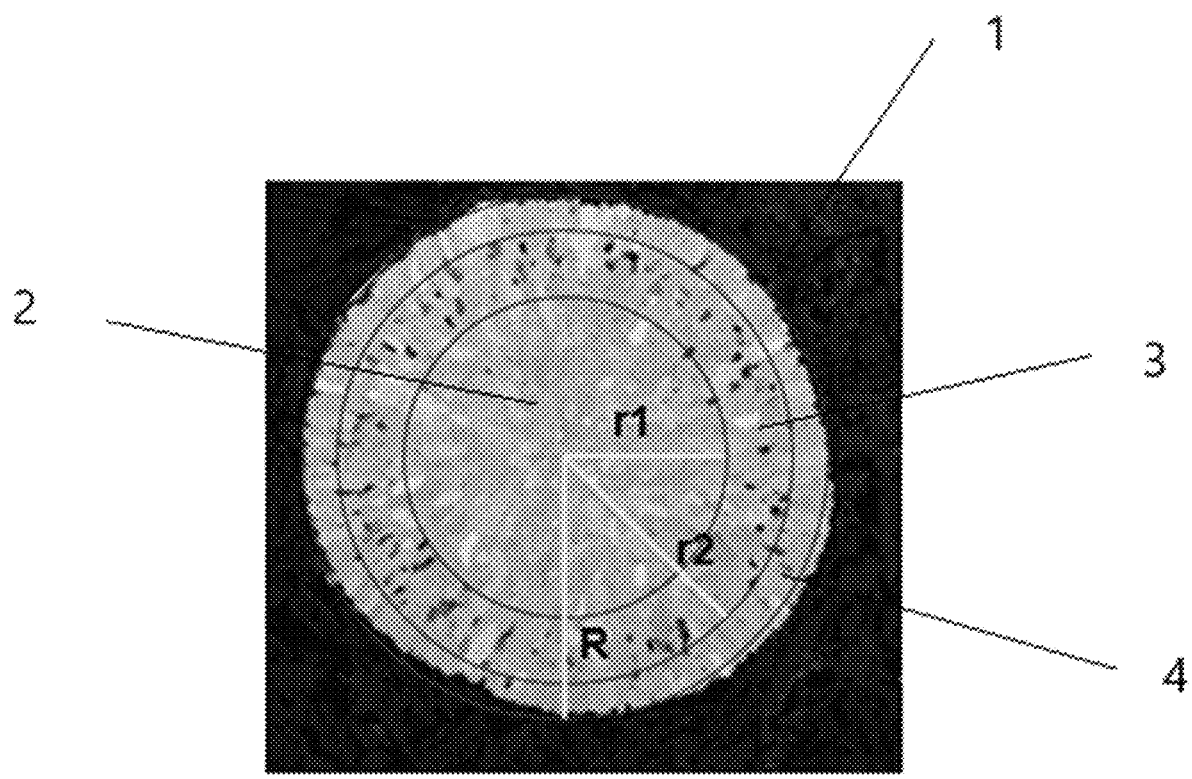
FIG. 1 illustrates a Scanning Electron Microscope (SEM) photograph of a cross-section and a loose and porous structure at the inner and intermediate portion of secondary particles of the cathode material in Example 1, wherein r1 denotes an inner radius of the circular ring of the middle layer, r2 denotes an outer radius of the circular ring of the middle layer, R denotes the radius of secondary particles, numerical reference 1 denotes the secondary particle, numerical reference 2 denotes an inner core structure, numerical reference 3 denotes the middle layer, and numerical reference 4 denotes a shell layer 4, positioned along the direction from the center to the surface of the secondary particle 1.

The inventors of the present disclosure have discovered in research that the crystal structure of the conventional cathode material has a defect that the intercalation/de-intercalation of lithium ions in the positive material bulk phase are difficult because the lithium diffusion kinetics is slow, and the electrolyte infiltration is insufficient, thereby causing the problem that the lithium-ion battery assembled with the cathode material exhibits low capacity and low first efficiency. FIG. 1 illustrates a Scanning Electron Microscope (SEM) photograph of a cross-section and a loose and porous structure at the intermediate portion of secondary particles of the cathode material in Example 1, as shown in FIG. 1, the secondary particle 1 of the lamellar cobalt-free cathode material provided by the present disclosure sequentially comprises an inner core structure 2, a middle layer 3 and a shell layer 4 along the direction from the center to the surface of the secondary particle 1, and the middle layer 3 is distributed in a circular ring shape wherein r1 denotes an inner radius of the circular ring of the middle layer 3, r2 denotes an outer radius of the circular ring of the middle layer; R denotes the radius of secondary particles; in addition, when the relationship between inner radius r1 of the circular ring and radius R of secondary particles satisfies the aforementioned relation, the loose and porous structure of the middle layer 3 of cathode material can be ensured to enter a certain depth inside the secondary particles, thereby providing sufficient electrolyte infiltration inside the secondary particles, shortening the ion diffusion distance, and buffering the volume change in the process of lithium de-intercalation, so that the lithium ion battery containing the cathode material has high first charge-discharge capacity, first efficiency, rate capability, and high capacity retention rate.

Further, the inventors have discovered through research that the crystal structure of the conventional cathode material has a defect that the intercalation/de-intercalation of lithium ions in the positive material bulk phase is difficult because the lithium diffusion kinetics is slow, and the electrolyte infiltration is insufficient, thereby causing the problem that the lithium-ion battery assembled with the cathode material exhibits low capacity and low first efficiency. The secondary particle of the cathode material provided by the present disclosure has a structure of close packing of an inner core structure, loose and porous middle layer, and close packing of a shell layer, wherein the close packing of an inner core structure can ensure the solid inter-particle contact in the cathode material to facilitate the electron/ion transport, and provide the sufficient powder density; the loose and porous middle layer not only can provide an effect of storing the electrolyte, but also can buffer the volume change and structural stress generated by the close packing of the inner core structure and the shell layer during the lithium de-intercalation/intercalation process, so that the stability of the secondary particles structure in the repeated charge and discharge process is maintained, the occurrence of problems such as breakage, or even pulverization and falling of the secondary particles are reduced, and the cycle life is further prolonged; moreover, the electrolyte can enter the porous structure of the middle layer through the gaps between the primary particles of the shell layer which is densely stacked, thereby providing the sufficient solid-liquid interface and a buffer interval for the de-intercalation of lithium in the inner core structure, and further improving the discharge capacity and the first efficiency of the lithium ion battery containing the cathode material.

In the present disclosure, the porosity of the middle layer is determined by the ratio of the pore area in the annular area of the middle layer to the circular ring area of the middle layer in the Scanning Electron Microscope (SEM) image showing the cross-section of the secondary particles of the cathode material, wherein the pore area and the circular ring area are measured through the grid method.

In the present disclosure, when the porosity of the middle layer falls into the aforementioned range, it indicates that the middle layer exhibits a loose and porous structure, thereby ensuring that the secondary particles of the cathode material have the specific structure of the present disclosure.

As can be seen from FIG. 1, the middle layer 3 of the secondary particles in the present disclosure has a porous structure with a nano-scale size, the number of the porous structures is large, and the porous structures are uniformly distributed; when the cathode material is used in a lithium ion battery electrode structure, the porous structure of the middle layer 3 can accommodate a certain amount of electrolyte infiltrated through gaps between primary particles of the shell layer, compared with a dense stacking structure of secondary particles of conventional cathode material, it can stably provide richer solid-liquid contact interface, which is beneficial for ion exchange both in the secondary particles and on the surface thereof, the lithium ion transmission path is shortened, and the electrode polarization is reduced, thereby realizing exertion of a high capacity and an excellent rate capability; the pore structure provided by the middle layer 3 can also be used as a buffer layer for the volume change and structural stress of the secondary particles during the lithium de-intercalation process, so that the structural stability of the secondary particles in the repeated charging and discharging process is maintained, the occurrence of problems such as breakage, or even pulverization and falling of the secondary particles are reduced, and the cycle life is further prolonged. Meanwhile, the distribution thickness (i.e., r2/R−r1/R) of the middle layer of the secondary particles in the present disclosure is controlled to be within a certain range, the negative effects can be further avoided, namely, the density of material powder is reduced due to excessive internal pores of the secondary particles, the processability is influenced, the service life and safety risk caused by side reactions resulting from excessive solid-liquid interfaces.

In the present disclosure, the average pore diameter of the middle layer is measured with a method of randomly selecting 20 pores in the middle layer in a cross-section SEM photograph of secondary particles, respectively measuring the longest pore diameter and the shortest pore diameter, and calculating an average value.

Further, r1/R is within the range of 0.4-0.7.

Further, the middle layer exhibits a reticulate loose and porous structure.

Further, the porosity of said middle layer is within the range of 25-35%.

Further, the average pore diameter of said middle layer is within the range of 300-500 nm.

According to the present disclosure, an outer radius r2 of the circle ring of the middle layer and the radius R of the secondary particles satisfy the following relation:

$$0.5 < r2/R < 1.$$

In the present disclosure, when the outer radius r2 of the circle ring of the middle layer and the radius R of the secondary particles satisfies the aforementioned relation, it can be ensured that the middle layer of the cathode material is close to the surface of the secondary particles, which is convenient for the electrolyte to smoothly infiltrate, and the denser shell layer performs the protecting and supporting functions, so as to maintain the structural stability, such that the lithium-ion battery containing the cathode material has high first charge-discharge capacity, first efficiency, rate capability, and high capacity retention rate.

Further, r2/R is within the range of 0.7-0.9.

According to the present disclosure, r2/R−r1/R is preferably within the range of 0.1-0.5.

In the present disclosure, when the inner radius r1 of the circular ring and an outer radius r2 of the circle ring of the middle layer satisfies the aforementioned relation, it can be ensured that the middle layer of the cathode material has a certain thickness, so that a certain number of internal porous structures are provided, the electrolyte can be sufficiently infiltrated, and the ion exchange is accelerated, the lithium-ion battery containing the cathode material has high first charge-discharge capacity, first efficiency, rate capability, and high capacity retention rate; and the density is not reduced due to excessive internal pores of the material, thereby ensuring the processability of the material.

Furthermore, r2/R−r1/R is within the range of 0.2-0.4.

In the present disclosure, the inner radius r1 of the circular ring, the outer radius r2 of the circular ring of the middle layer, and the radius R of the secondary particles in the cathode material are obtained by performing circle fitting and radius measurement on a cross-sectional SEM photograph of a secondary sphere of the cathode material.

According to the present disclosure, the secondary particles have an average particle diameter $D_{50}$ within the range of 8-20 μm.

In the present disclosure, when the average particle diameter of the secondary particles falls into the above range, the cathode material can satisfy both the powder density of the cathode material and the discharge capacity of the lithium-ion battery.

In the present disclosure, the average particle diameter of the secondary particles of the cathode material is determined by a method of measuring the light scattering characteristics of the powder material dispersed in pure water by a laser particle size analyzer.

According to the present disclosure, the primary particles of the inner core structure are closely packed in a spherical and/or spheroidal shape.

According to the present disclosure, the length-diameter ratio L1 of primary particles of the inner core structure satisfies: 1≤L1≤2.

In the present disclosure, the length-diameter ratio L1 of primary particles of the inner core structure refers to the ratio of the longest axis length to the shortest axis length of the internal close packing portion in the Scanning Electron Microscope (SEM) image of a cross-section of secondary particles of the cathode material.

In the present disclosure, when the length-diameter ratio L1 of primary particles of the inner core structure falls into the aforementioned range, it can be ensured that the primary particles of the inner core structure are closely packed in a spherical and/or spheroidal shape, so that the close packing of an inner core part is realized, the contact among the primary particles is improved, ion transmission among particles is facilitated, and the density of the material is ensured.

Furthermore, 1.2≤L1≤1.8.

According to the present disclosure, the primary particles of the shell layer are radially and closely packed. Preferably, the long axis direction of the primary particles of the shell layer is distributed along the radial direction towards the center of the secondary particles.

According to the present disclosure, the length-diameter ratio L2 of primary particles of the shell layer satisfies: 2.5≤L2≤5.

In the present disclosure, the length-diameter ratio L2 of primary particles of the shell layer refers to the ratio of the longest axis length to the shortest axis length of primary particles which are closely piled and close to the surface of secondary particles in the Scanning Electron Microscope (SEM) image of a cross-section of secondary particles of the cathode material.

In the present disclosure, when the length-diameter ratio L2 of primary particles of the shell layer fall into the range, it can be ensured that the primary particles of the shell layer are radially and densely stacked, the long axes of the primary particles are distributed along the radial direction towards the center of the secondary particles, on one hand, the transmission distance of lithium ions in the primary particles can be shortened, the capacity and the rate performance can be conveniently exerted, on the other hand, the gaps among the particles allow the smooth infiltration of electrolyte such that the electrolyte is stored in pore structure of the middle layer, so that the lithium ions in the secondary particles can be rapidly de-intercalated, the polarization is reduced, and the rate capability is improved; on the further hand, the radially and closely packed shell layer can directionally release structural stress generated by volume change during the process of lithium intercalation and de-intercalation of the secondary particles, so that the structural integrity of the secondary particles in the process of repeated charging and discharging is maintained, and the service life is improved.

Further, 3≤L2≤4.

According to the present disclosure, the primary particles of the cathode material have an average particle size within the range of 300-700 nm.

In the present disclosure, when the average particle size of primary particles used for forming the secondary particles falls into the range, it is beneficial that the primary particles of the cathode material can realize the rapid ion transmission, ensure that the lithium-ion battery containing the cathode material has high capacity and rate performance, control the contact degree of an electrolyte-cathode material interface, reduce the occurrence of side reactions, improve the strength of particle structure of the cathode material, and maintain the desirable cycle life of the lithium-ion battery.

Further, the primary particles of the cathode material have an average particle size within the range of 400-600 nm.

In the present disclosure, the average particle size of primary particles of the cathode material is determined by a method of randomly selecting 20 primary particles in a cross-section SEM image of the secondary particles of the cathode material, respectively measuring the longest particle size and the shortest particle size of the cross-section, and calculating an average value.

According to the present disclosure, the tap density TD of the cathode material is more than or equal to 2.5 g/cm³, preferably within the range of 2.5-3 g/cm³.

According to the present disclosure, the cathode material has a composition represented by formula I:

$$Li_{1+a}Ni_xM_yM'_zO_2 \quad \text{formula I};$$

wherein −0.1≤a≤0.2, 0.5≤x≤1, 0≤y≤0.5, 0≤z≤0.1, and x+y+z=1; M is at least one element selected from the group consisting of Mn, Al, Fe, and Mg; M' is at least one element selected from the group consisting of B, Mg, Al, Ca, Sr, Ba, Zr, Ti, Ce, Y, W, La, Nb, Ta, Zn, Co, and Mo.

Further, the cathode material is a lamellar cobalt-free cathode material.

In the present disclosure, as long as the cathode material has the characteristics described in the first aspect of the present disclosure, that is, the cathode material is composed of secondary particles agglomerated by primary particles; the secondary particle sequentially comprises an inner core structure, a middle layer and a shell layer along the direction from the center to the surface of the secondary particle; the middle layer exhibits a reticulate loose and porous structure and is distributed in a circular ring shape, and the inner radius r1 of the circular ring and the radius R of the secondary particles satisfy the specific relation, it can be ensured that the lithium-ion battery containing the cathode material has high first charge-discharge capacity, first efficiency, rate capability, and high capacity retention rate. As for the preparation methods for the cathode material, each falls into the protection scope of the present disclosure, as long as the cathode material described in the first aspect of the present disclosure can be produced.

In order to further realize the regulation and control of the structure of the cathode material in the present application, the lithium-ion battery containing the cathode material has a high first charge-discharge capacity, first efficiency, rate capability, and high capacity retention rate, it is preferable that the second aspect of the present disclosure also provides a method for preparing the cathode material comprising the following steps:

(1) mixing a nickel salt, an optional M salt, and an optional M' element-containing compound with a solvent to prepare a mixed salt solution, preparing a precipitant solution with a precipitant, and preparing a complexing agent solution with a complexing agent;

(2) introducing the mixed salt solution into a reaction kettle containing the precipitant solution and the complexing agent solution to carry out a co-precipitation reaction, in the presence of a protective atmosphere; the co-precipitation reaction is performed according to the following steps:

(2-1) controlling the temperature of the reaction system to be T1, carrying out a first-stage co-precipitation reaction until the median particle diameter $D_{50}$ of the co-precipitated particles reaches D1, then stopping the introduction of the mixed salt solution;

(2-2) controlling the temperature of the reaction system to be T2, continuously introducing the mixed salt solution to perform a second-stage co-precipitation reaction until the median particle diameter $D_{50}$ of the co-precipitated particles reaches D2, then stopping the introduction of the mixed salt solution;

(2-3) controlling the temperature of the reaction system to be T3, continuously introducing the mixed salt solution to perform a third-stage co-precipitation reaction until the median particle diameter $D_{50}$ of the co-precipitated particles reaches D3, then stopping the introduction of the (2-4) aging, separating, washing, and drying the co-precipitation slurry obtained in step (2-3) to obtain a cathode material precursor;

(3) blending a lithium source, the cathode material precursor, and an optional M' element-containing compound to obtain a mixture, sintering the mixture in the presence of an oxygen-containing atmosphere, then cooling, crushing, sieving the sintered product and removing iron thereof to prepare a cathode material; wherein T1>T2, 0.35<D1/D3<1.

In the present disclosure, the temperature of the co-precipitation reaction in the growth stage of the precursor and the particle size of co-precipitation particles can be adjusted to ensure that the secondary particles of the precursor have different degrees of crystallinity at different thicknesses, so that the secondary particles of the cathode material obtained from sintering the precursor may sequentially comprise an inner core structure, a middle layer and a shell layer along the direction from the center to the surface of the secondary particle, and the middle layer is distributed in a circular ring shape, and the inner radius r1 of the circular ring and the radius R of the secondary particles satisfy the specific relation, and the secondary particles of the cathode material have different degrees of close packing at different thicknesses.

Further, T1−T2 is larger than or equal to 15° C., preferably T1−T2 is within the range of 15-40° C.

Furthermore, D1/D3 is within the range of 0.4-0.7.

According to the present disclosure, |T1−T3|≤5° C.

In the present disclosure, when the temperature of the first-stage co-precipitation reaction and the temperature of the third-stage co-precipitation reaction are controlled to satisfy the range conditions, both the inner part and the surface layer of the co-precipitation product have desirable crystallinity, the obtained cathode material has excellent crystallinity, which is conducive to exertion of the electrical properties of the cathode material.

Further, |T1−T3| is within the range of 2-5° C.

According to the present disclosure, 0.5<D2/D3<1.

In the present disclosure, when the ratio D2/D3 is controlled to be within the range, the electrolyte can be rapidly immersed into the middle layer from the outside of the secondary particles and stored in the pore structure thereof, thereby improving the electrical property, and obtaining a densely-piled shell layer with a certain thickness, and maintaining the structural stability of the secondary particles.

Further, D2/D3 is within the range of 0.7-1, preferably within the range of 0.7-0.9.

According to the present disclosure, D2/D3−D1/D3 is within the range of 0.1-0.5.

In the present disclosure, when the parameter D2/D3−D1/D3 is controlled to be within a certain range, particularly, when the parameter D2/D3−D1/D3 is controlled to be within the above range, it can be maintained that each of the closely packed inner core, the porous middle layer, and the closely packed outer shell has an appropriate thickness, thereby sufficiently exerting the respective advantages of the three structures and obtaining the desired comprehensive performance.

Furthermore, D2/D3−D1/D3 is within the range of 0.2-0.4.

According to the present disclosure, the temperature T1 is within the range of 60-80° C., preferably within the range of 65-75° C.; the particle diameter D1 is within the range of 4-10 μm, preferably within the range of 5-9 μm.

According to the present disclosure, the temperature T2 is within the range of 40-60° C., preferably within the range of 45-55° C.; the particle diameter D2 is within the range of 6-18 μm, preferably within the range of 7-14 μm.

According to the present disclosure, the temperature T3 is within the range of 40-80° C., preferably within the range of 65-75° C.; the particle diameter D3 is within the range of 8-20 μm, preferably within the range of 9-16 μm.

According to the present disclosure, the nickel salt, the M salt, and the M' element-containing compound are used in an amount such that the molar ratio of n(Ni):n(M):n(M') is (0.5-1):(0-0.5):(0-0.1).

According to the present disclosure, the nickel salt and the M salt are each independently at least one selected from the group consisting of sulfate salt, chloride salt, nitrate salt, and acetate.

According to the present disclosure, the M' element-containing compound in step (1) is at least one selected from the group consisting of sulfate, chloride, nitrate, and acetate of M'.

According to the present disclosure, the M' element-containing compound in step (3) is at least one selected from the group consisting of oxide, hydroxide, and oxyhydroxide of M'.

According to the present disclosure, the solvent is at least one selected from the group consisting of water, inorganic acids, alcohols, ethers, and amines.

According to the present disclosure, the precipitant is at least one selected from the group consisting of sodium hydroxide, sodium carbonate, sodium bicarbonate, sodium oxalate, potassium hydroxide, potassium carbonate, potassium bicarbonate, and potassium oxalate.

According to the present disclosure, the complexing agent is at least one selected from the group consisting of ammonium hydroxide, ammonium sulfate, ammonium nitrate, ammonium chloride, salicylic acid, sulfosalicylic acid, and ethylenediaminetetraacetic acid.

According to the present disclosure, the protective atmosphere is at least one selected from the group consisting of nitrogen gas, argon gas, air, and oxygen gas.

According to the present disclosure, the pH values of the first-stage co-precipitation reaction, the second-stage co-precipitation reaction, and the third-stage co-precipitation reaction are independently within the range of 9-13.

In the present disclosure, the introduction amount of the precipitant solution and the complexing agent solution is not particularly limited, as long as the pH values of the first-stage co-precipitation reaction, the second-stage co-precipitation reaction, and the third-stage co-precipitation reaction in the reaction kettle are independently within the range of 9-13.

In the present disclosure, the pH value of the first-stage co-precipitation reaction, the pH value of the second-stage co-precipitation reaction, and the pH value of the third-stage co-precipitation reaction can be the same or different.

In the present disclosure, the concentrations of the precipitant solution and the complexing agent solution are not particularly limited, and the concentrations may be conventional in the art.

In the present disclosure, the co-precipitation reactions (the first-stage co-precipitation reaction, the second-stage co-precipitation reaction, and the third-stage co-precipitation reaction) are performed with stirring, preferably, the rotational speed of the stirring is within the range of 200-700 rpm, more preferably within the range of 400-600 rpm.

According to the present disclosure, the lithium source, the cathode material precursor, and the M' element-containing compound are used in an amount such that n(Li)/[n(Ni)+n(M)+n(M')] is within the range of (1-1.2):1.

According to the present disclosure, the M' element-containing compound in step (1) and the M' element-containing compound in step (3) are used in an amount such that n(M')/[n(Ni)+n(M)+n(M')] in said lamellar cobalt-free electrode material is within the range of 0-0.1, preferably within the range of 0-0.05.

According to the present disclosure, the oxygen-containing atmosphere is selected from oxygen gas and/or air.

In the oxygen-containing atmosphere of the present disclosure, the oxygen concentration is larger than or equal to 20 vol. %, preferably within the range of 50-100 vol. %.

According to the present disclosure, the sintering conditions comprising: a sintering temperature within the range of 600-1,000° C. and a sintering time within the range of 6-20 h.

In the present disclosure, the sintering conditions comprising: raising the temperature from 20-30° C. to 600-1,000° C. at the temperature rise rate of 0.3-5° C./min, and preserving the temperature for 6-20 h.

Further, the sintering conditions comprising: a sintering temperature within the range of 650-900° C. and a sintering time within the range of 7-15 h.

Further, the sintering conditions comprising: raising the temperature from 20-30° C. to 650-900° C. at the temperature rise rate of 0.5-3° C./min, and preserving the temperature for 7-15 h.

In the third aspect, the present disclosure provides a lamellar cobalt-free cathode material produced with the aforementioned method.

The fourth aspect of the present disclosure provides the use of a lamellar cobalt-free cathode material in the lithium-ion battery.

The present disclosure will be described in detail below with reference to examples. In the following examples,
  the morphology of the cathode material was characterized by using a Scanning Electron Microscope (SEM);
  the inner radius r1 of the circular ring of the middle layer of the secondary particles, the outer radius r2 of the circle ring of the middle layer of the secondary particles, and the radius R of the secondary particles of the cathode material were obtained by performing circle fitting and radius measurement on a cross-sectional SEM photograph of a secondary sphere of the cathode material;
  the porosity of the middle layer in the secondary particles of the cathode material was determined by the ratio of the pore area in the annular area of the middle layer to the circular ring area of the middle layer in the Scanning Electron Microscope (SEM) image of the cross-section of the secondary particles of the cathode material, wherein the pore area and the circular ring area were measured through the grid method;

the average pore diameter of the primary particles of the cathode material was measured by a method of randomly selecting 20 primary particles in a cross-section SEM photograph of secondary particles of the cathode material, measuring the longest particle diameter and the shortest particle diameter of the cross-section respectively, and calculating an average value;

the tap Density (TD) of the cathode material was measured according to the National Standard GB/T5162 of China, namely "Determination of tap density of metallic powders";

the raw materials used in the Examples and Comparative Examples are all commercially available products.

Example 1

(1) Both nickel sulfate and manganese sulfate were added to water according to the molar ratio of n(Ni):n(Mn) =0.9:0.1 to prepare a mixed salt solution.
(2) An aqueous sodium hydroxide solution serving as a precipitant and ammonia water serving as a complexing agent were added into a synthesis kettle, nitrogen gas was introduced in advance as a protective atmosphere before the start of the co-precipitation reaction, and the introduction amounts of the precipitant solution and the complexing agent solution were adjusted, the pH value of a solution system was controlled to be 10.5, then a mixed salt solution was introduced in a cocurrent flow mode, the stirring was continuously implemented, and the co-precipitation reaction was started.
(2-1) In the first stage, the temperature of a solution system in a synthesis kettle was controlled to be 70° C., the first-stage co-precipitation reaction was performed, the growth particle size of co-precipitation particles in the solution system was monitored to reach 8 μm, the feeding of liquid was stopped;
(2-2) in the second stage, the temperature of the solution system in the synthesis kettle was adjusted to 50° C., the second-stage co-precipitation reaction was implemented, the growth particle size of co-precipitation particles in the solution system was monitored to reach 12 μm, the feeding of liquid was stopped;
(2-3) in the third stage, the temperature of the solution system in the synthesis kettle was adjusted to 65° C., the third-stage co-precipitation reaction was carried out, the growth particle size of co-precipitation particles in the solution system was monitored to reach 14 μm, the feeding of liquid was then stopped; (2-4) the co-precipitation slurry was transferred to an aging kettle, and subjected to aging, solid-liquid separation, washing, and drying process to obtain a precursor material $Ni_{0.9}Mn_{0.1}(OH)_2$;
(3) lithium hydroxide, the $Ni_{0.9}Mn_{0.1}(OH)_2$ precursor, and a $TiO_2$ additive were uniformly mixed according to the molar ratio of n(Li):[n(Ni)+n(Mn)]:n(Ti)=1.02:0.995: 0.005, the mixture was transferred to an atmosphere furnace, oxygen gas was continuously introduced, the oxygen concentration in the furnace was maintained to be greater than 80 vol %, the temperature was raised to 800° C. at the temperature-rise ratio of 3° C./min, and then sintered for 12 h, the temperature was naturally cooled to room temperature, the sintered product was crushed and sieved to obtain a cathode material A1, wherein the composition of the cathode material A1 was $Li_{1.02}Ni_{0.896}Mn_{0.099}Ti_{0.005}O_2$.

Examples 2-13

The cathode materials were prepared according to the method of Example 1, the raw material ratios and specific process conditions were shown in Table 1. The cathode materials A2-A13 were prepared. The composition of each of the cathode materials A2-A13 was $Li_{1.02}Ni_{0.896}Mn_{0.099}Ti_{0.005}O_2$.

Comparative Examples 1-5

The cathode materials were prepared according to the method of Example 1, the raw material ratios and specific process conditions were shown in Table 1. The cathode materials D1-D5 were prepared. The composition of each of the cathode materials D1, D3, D4 and D5 was $Li_{1.02}Ni_{0.896}Mn_{0.099}Ti_{0.005}O_2$, the composition of the cathode material D2 was $Li_{1.02}Ni_{0.9}Mn_{0.1}O_2$.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Mixed salt and ratio | Ni | 0.9 | 0.896 | 0.9 | 0.9 | 0.9 | 0.9 | 0.9 | 0.9 | 0.9 | 0.9 |
| | Mn | 0.1 | 0.099 | 0.1 | 0.1 | 0.1 | 0.1 | 0.1 | 0.1 | 0.1 | 0.1 |
| | Ti | / | 0.005 | / | / | / | / | / | / | / | / |
| Co-precipitation | pH | 10.5 | 10.5 | 10.5 | 10.5 | 10.5 | 10.5 | 10.5 | 10.5 | 10.5 | 10.5 |
| | T1(° C.) | 70 | 70 | 70 | 70 | 70 | 70 | 70 | 79 | 75 | 65 |
| | D1(μm) | 8 | 8 | 6 | 10.5 | 8 | 8 | 8 | 8 | 8 | 8 |
| | T2(° C.) | 50 | 50 | 50 | 50 | 50 | 50 | 50 | 50 | 40 | 55 |
| | D2(μm) | 12 | 12 | 12 | 12 | 13 | 9.5 | 12 | 12 | 12 | 12 |
| | T3(° C.) | 65 | 65 | 65 | 65 | 65 | 65 | 65 | 65 | 71 | 63 |
| | D3(μm) | 14 | 14 | 14 | 14 | 14 | 14 | 18 | 13 | 14 | 14 |
| | T1-T2(° C.) | 20 | 20 | 20 | 20 | 20 | 20 | 20 | 20 | 35 | 10 |
| | D1/D3 | 0.57 | 0.57 | 0.43 | 0.75 | 0.57 | 0.57 | 0.44 | 0.62 | 0.57 | 0.57 |
| | \|T1-T3\|(° C.) | 5 | 5 | 5 | 5 | 5 | 5 | 5 | 5 | 4 | 2 |
| | D2/D3 | 0.86 | 0.86 | 0.86 | 0.86 | 0.93 | 0.68 | 0.67 | 0.92 | 0.86 | 0.86 |
| | D2/D3-D1/D3 | 0.29 | 0.29 | 0.43 | 0.11 | 0.36 | 0.11 | 0.22 | 0.31 | 0.29 | 0.29 |
| Ratio of mixed materials | Li | 1.02 | 1.02 | 1.02 | 1.02 | 1.02 | 1.02 | 1.02 | 1.02 | 1.02 | 1.02 |
| | Precursor | 0.995 | 1 | 0.995 | 0.995 | 0.995 | 0.995 | 0.995 | 0.995 | 0.995 | 0.995 |
| | Ti | 0.005 | / | 0.005 | 0.005 | 0.005 | 0.005 | 0.005 | 0.005 | 0.005 | 0.005 |
| Sintering | Temperature (° C.) | 800 | 800 | 800 | 800 | 800 | 800 | 800 | 800 | 800 | 800 |
| | Time (h) | 12 | 12 | 12 | 12 | 12 | 12 | 12 | 12 | 12 | 12 |

TABLE 1-continued

|  |  | Example 11 | Example 12 | Example 13 | Comparative Example 1 | Comparative Example 2 | Comparative Example 3 | Comparative Example 4 | Comparative Example 5 |
|---|---|---|---|---|---|---|---|---|---|
| Mixed salt and ratio | Ni | 0.9 | 0.75 | 0.9 | 0.9 | 0.9 | 0.9 | 0.9 | 0.9 |
|  | Mn | 0.1 | 0.25 | 0.1 | 0.1 | 0.1 | 0.1 | 0.1 | 0.1 |
|  | Ti | / | / | / | / | / | / | / | / |
| Co-precipitation | pH | 10.5 | 11.2 | 10.5 | 10.5 | 10.5 | 10.5 | 10.5 | 10.5 |
|  | T1(° C.) | 70 | 65 | 70 | 70 | 70 | 70 | 50 | 70 |
|  | D1(μm) | 8 | 8 | 8 | 14 | 3 | 3 | 3 | 8 |
|  | T2(° C.) | 50 | 45 | 30 | / | 50 | 50 | 7 | 63 |
|  | D2(μm) | 14 | 12 | 12 | / | 12 | 5 | 12 | 12 |
|  | T3(° C.) | / | 60 | 65 | / | 65 | 65 | 55 | 65 |
|  | D3(μm) | / | 14 | 14 | / | 14 | 14 | 14 | 14 |
|  | T1-T2(° C.) | 20 | 20 | 20 | / | 20 | 20 | -20 | 20 |
|  | D1/D3 | / | 0.57 | 0.57 | / | 0.21 | 0.21 | 0.21 | 0.57 |
|  | \|T1-T3\|(° C.) | / | 5 | 5 | / | 5 | 5 | 5 | 5 |
|  | D2/D3 | / | 0.86 | 0.86 | / | 0.86 | 0.36 | 0.86 | 0.86 |
|  | D2/D3-D1/D3 | / | 0.29 | 0.29 | / | 0.64 | 0.14 | 0.64 | 0.29 |
| Ratio of mixed materials | Li | 1.02 | 1.02 | 1.02 | 1.02 | 1.02 | 1.02 | 1.02 | 1.02 |
|  | Precursor | 0.995 | 0.995 | 0.995 | 0.995 | 1 | 0.995 | 0.995 | 0.995 |
|  | Ti | 0.005 | 0.005 | 0.005 | 0.005 | / | 0.005 | 0.005 | 0.005 |
| Sintering | Temperature (° C.) | 800 | 900 | 800 | 800 | 800 | 800 | 800 | 800 |
|  | Time (h) | 12 | 12 | 12 | 12 | 12 | 12 | 12 | 12 |

The structures of the cathode materials prepared in the Examples and Comparative Examples were characterized, and the results were shown in Table 2, respectively.

TABLE 2

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| TD(g/cm³) | 2.62 | 2.59 | 2.57 | 2.63 | 2.58 | 2.64 | 2.63 | 2.60 | 2.55 | 2.60 |
| r1(μm) | 3.8 | 3.6 | 2.8 | 4.8 | 3.7 | 3.6 | 3.3 | 3.8 | 4.0 | 3.7 |
| r2(μm) | 5.7 | 5.5 | 5.7 | 5.6 | 6.0 | 4.5 | 5.5 | 5.6 | 5.6 | 5.6 |
| R(μm) | 6.6 | 6.5 | 6.7 | 6.7 | 6.6 | 6.5 | 8.5 | 6.0 | 6.7 | 6.5 |
| r1/R | 0.58 | 0.55 | 0.42 | 0.72 | 0.56 | 0.55 | 0.39 | 0.63 | 0.60 | 0.57 |
| r2/R | 0.86 | 0.85 | 0.86 | 0.84 | 0.91 | 0.69 | 0.65 | 0.93 | 0.84 | 0.86 |
| r2/R-r1/R | 0.29 | 0.29 | 0.44 | 0.12 | 0.35 | 0.14 | 0.26 | 0.30 | 0.24 | 0.29 |
| Porosity of middle layer (%) | 30.3 | 26.6 | 32.2 | 27.5 | 34.1 | 28.9 | 31.5 | 29.8 | 37.6 | 22.8 |
| Average pore diameter of middle layer (nm) | 410 | 340 | 420 | 350 | 430 | 370 | 410 | 400 | 490 | 270 |
| Length-diameter ratio L2 | 3.1 | 3.9 | 3.6 | 3.2 | 2.8 | 3.5 | 3.7 | 2.9 | 4.2 | 3.0 |
| Length-diameter ratio L1 | 1.4 | 1.6 | 1.7 | 1.6 | 1.5 | 1.6 | 1.4 | 1.5 | 1.3 | 1.9 |
| Average size of primary particles (nm) | 500 | 480 | 510 | 470 | 510 | 470 | 480 | 500 | 490 | 520 |

|  | Example 11 | Example 12 | Example 13 | Comparative Example 1 | Comparative Example 2 | Comparative Example 3 | Comparative Example 4 | Comparative Example 5 |
|---|---|---|---|---|---|---|---|---|
| TD(g/cm³) | 2.50 | 2.57 | 2.49 | 2.66 | 2.34 | 2.59 | 2.54 | 2.64 |
| r1(μm) | 3.7 | 4.0 | 3.8 | 0.0 | 0.9 | 1.0 | 1.2 | 3.9 |
| r2(μm) | 6.3 | 5.9 | 5.6 | 0.0 | 5.2 | 2.3 | 5.5 | 5.5 |
| R(μm) | 6.3 | 6.9 | 6.6 | 6.7 | 6.6 | 6.6 | 6.4 | 6.6 |
| r1/R | 0.59 | 0.58 | 0.58 | / | 0.14 | 0.15 | 0.19 | 0.59 |
| r2/R | 1 | 0.86 | 0.85 | / | 0.79 | 0.35 | 0.86 | 0.83 |
| r2/R-r1/R | 0.41 | 0.28 | 0.27 | / | 0.65 | 0.20 | 0.67 | 0.24 |
| Porosity of middle layer (%) | 31 | 35.4 | 45.8 | / | 36.3 | 23.7 | 1.2 | 12.4 |
| Average pore diameter of middle layer (nm) | 390 | 450 | 600 | / | 380 | 370 | 70 | 150 |
| Length-diameter ratio L2 | / | 3.2 | 3.0 | 1.8 | 3.4 | 2.7 | 2.3 | 3.3 |
| Length-diameter ratio L1 | 1.7 | 1.6 | 1.4 | 1.6 | 1.5 | 1.4 | 2.1 | 1.5 |
| Average size of primary particles (nm) | 500 | 530 | 490 | 460 | 520 | 490 | 540 | 500 |

Figure 2:
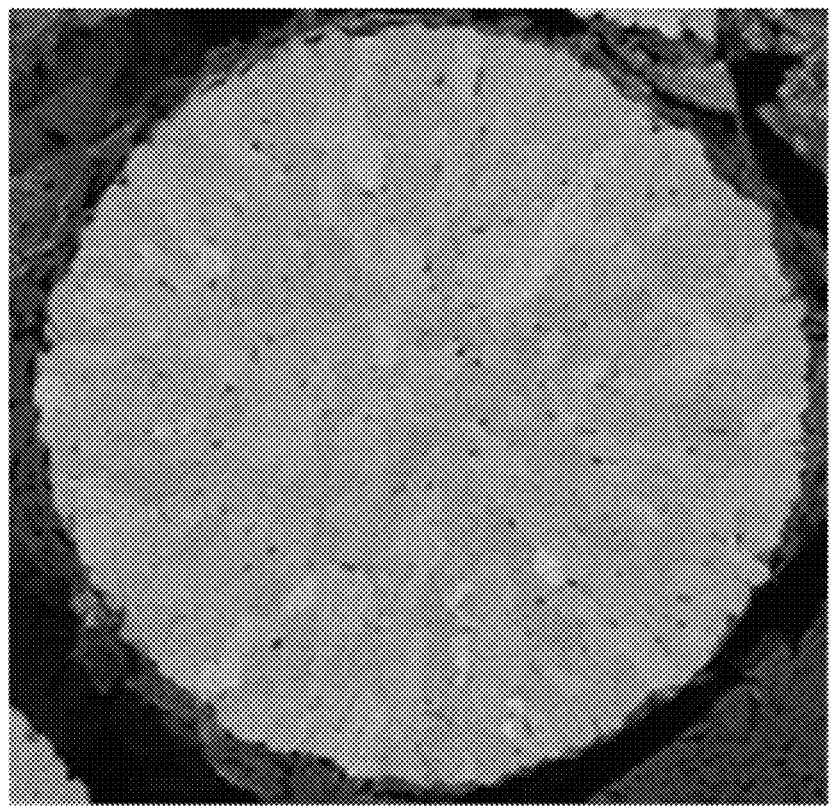
FIG. 2 illustrates an SEM photograph of the cross-section and the internal structure of secondary particles of the cathode material in Comparative Example 1.

FIG. 1 illustrates an SEM photograph of a cross-section and a loose and porous structure at the inner and intermediate portion of secondary particles of the cathode material in Example 1, wherein r1 denotes an inner radius of the circular ring of the middle layer, r2 denotes an outer radius of the circular ring of the middle layer; R denotes the radius of secondary particles; FIG. 2 illustrates an SEM photograph of the cross-section and the internal structure of secondary particles of the cathode material in Comparative Example 1.

As can be seen from FIG. 1 and FIG. 2, the multi-stage temperature-controlled synthesis method of the precursor provided by the present disclosure can effectively form a three-layer structure consisting of close packing of an inner core structure, loose and porous middle layer, and close packing of a shell layer in the secondary particles of the cathode material.

As illustrated by Table 2, relative to the cathode material produced in the Comparative Examples, the cathode materials produced in the Examples of the present disclosure are composed of secondary particles agglomerated by primary particles; the secondary particle sequentially comprises an inner core structure, a middle layer and a shell layer along the direction from the center to the surface of the secondary particle; the middle layer is distributed in a circular ring shape, and the inner radius r1 of the circular ring and the radius R of the secondary particles satisfy the relation that r1/R is more than 0.4 and less than 1.

Furthermore, the length-diameter ratio L2 of primary particles in the shell layer in the secondary particles of the cathode material prepared in Examples of the present disclosure is obviously different from the length-diameter ratio L1 of primary particles in the inner core structure, the length-diameter ratio L2 of primary particles in the shell layer is larger, which is conducive to forming a radial structure, the rapid de-intercalation of ions, and the electrolyte is infiltrated into the porous middle layer along gaps among particles; while the length-diameter ratio L1 of primary particles of the inner core structure is smaller, such that the inner core structure exhibits a spheroidal shape, the close packing is realized, and the powder density of the material is ensured.

Further, as can be seen from Table 2, the adding opportunity of the M' element-containing compound has no significant influence on the structural parameters of the cathode material and the distribution of the loose and porous middle layers of the secondary particles of the cathode material.

In the precursor synthesis process, if a multi-stage synthesis process is not adopted (i.e., Comparative Example 1) to obtain a precursor secondary particle structure with heterogeneous crystallinity, the characteristic of a loose and porous middle layer structure cannot be formed in the corresponding cathode material, and the dense packing is formed in the secondary particles, thus the tap density TD of the cathode material is high.

However, if the growth particle size of the internal core of the cathode material is too small, and the thickness of the middle layer is too large (i.e., Comparative Example 2), the internal portion of the secondary particles is excessively loose, and the tap density TD of the cathode material is too small.

Test Example

The cathode materials of the Examples and Comparative Examples were assembled into lithium-ion batteries, specifically:

The batteries were assembled according to the following steps:

Firstly, the cathode material prepared in Examples and Comparative Examples, conductive carbon black, and polyvinylidene fluoride (PVDF) were weighed respectively according to a mass ratio of 95%:2.5%:2.5% and then mixed, NMP was added and stirred such that the mixture formed a uniform slurry, which was coated on an aluminum foil, the coated aluminum foil was scraped flatly, dried and rolled to be flat, the cathode pole piece with a diameter of 12 mm and the thickness of 120 μm was punched under the pressure of 100 MPa, and then placed in a vacuum oven to be dried at the temperature of 120° C. for 12 hours.

The button cell assembly process was carried out in a glove box protected by the Ar gas, both the water content and the oxygen content in the glove box were less than 5 ppm. The obtained pole piece was used as the cathode, and a Li metal piece with a diameter of 17 mm and a thickness of 1 mm was used as the negative electrode; the separator was a porous polyethylene film having a thickness of 25 μm, the electrolyte was a mixed solution consisting of the same amount of Ethylene Carbonate (EC) and diethylene carbonate (DEC) in which 1 mol/L of $LiPF_6$ was dissolved, and the battery case was a button-type cell case of type 2025. After the assembly was completed, an unactivated battery was obtained.

The properties of the assembled lithium-ion battery were tested, and the test results were shown in Table 3 respectively. The charging capacity of the lithium-ion battery was measured with a method as follows: an assembled button cell after standing still for 2 h was taken, and then charged with a constant current of 0.1 C (1 C=200 mA/g) at room temperature until the cut-off voltage was 4.3V, and subsequently subjected to the constant voltage charging for 30 min;

the discharge capacity was measured by discharging the charged button cell at room temperature to 3.0V at a constant current of 0.1 C;

first efficiency was measured with a method of dividing the 0.1 C discharge capacity by the 0.1 C charge capacity;

the rate capability of 1 C/0.1 C was measured with a method as follows: sequentially performing constant-current charging and discharging with the current 0.2 C, 0.33 C, 0.5 C, and 1 C at room temperature on the button cell which completed one charging and discharging cycle with the current 0.1 C, wherein the voltage window was 4.3-3.0V, and then dividing the 1 C discharging capacity by the 0.1 C discharging capacity;

the capacity retention rate of 80 charge-discharge cycles was measured by taking the button cell which completed one charge and discharge cycle with the current 0.1 C, and then subjected to 80 charge-discharge cycles with the constant-current of 1 C at room temperature, wherein the voltage window was 4.3-3V, subsequently dividing the discharge capacity at 80 cycles by the discharge capacity at 1 cycle.

TABLE 3

|  | Example 1 | Example 2 | Example 3 | Example 4 | Example 5 | Example 6 | Example 7 | Example 8 | Example 9 | Example 10 |
| --- | --- | --- | --- | --- | --- | --- | --- | --- | --- | --- |
| 0.1 C charging capacity (mAh/g) | 237.1 | 236.5 | 236.9 | 236 | 236.4 | 236.3 | 234.3 | 237.3 | 236.5 | 236.2 |

TABLE 3-continued

| 0.1 C discharge capacity (mAh/g) | 210.4 | 208.9 | 210.5 | 206.1 | 209 | 205.9 | 203.2 | 208.6 | 208 | 204.7 |
|---|---|---|---|---|---|---|---|---|---|---|
| First efficiency (%) | 88.7 | 88.3 | 88.9 | 87.3 | 88.4 | 87.1 | 86.7 | 87.9 | 87.9 | 86.7 |
| 1 C/0.1 C (%) | 91.6 | 91.2 | 91.8 | 90.5 | 91.7 | 90.2 | 89.3 | 91.2 | 90.8 | 88.7 |
| Capacity Retention ratio of 80 cycles (%) | 84.9 | 85.2 | 80.5 | 81.6 | 79.6 | 82.2 | 82 | 80.5 | 80.6 | 78.1 |

|  | Example 11 | Example 12 | Example 13 | Comparative Example 1 | Comparative Example 2 | Comparative Example 3 | Comparative Example 4 | Comparative Example 5 |
|---|---|---|---|---|---|---|---|---|
| 0.1 C charging capacity (mAh/g) | 236.9 | 209.6 | 236.3 | 236.2 | 237.6 | 236.5 | 235.7 | 236.0 |
| 0.1 C discharge capacity (mAh/g) | 207.4 | 185.6 | 208.2 | 199.7 | 211.8 | 202.1 | 203.5 | 202.3 |
| First efficiency (%) | 87.5 | 88.5 | 87.3 | 84.5 | 89.1 | 85.5 | 86.3 | 85.7 |
| 1 C/0.1 C (%) | 90.4 | 90.4 | 90.3 | 85.3 | 92.1 | 86.2 | 87.7 | 87.6 |
| Capacity Retention ratio of 80 cycles (%) | 76.6 | 90.7 | 77.4 | 72.1 | 64.6 | 73.9 | 67.3 | 75.8 |

As can be seen from Table 3, the lithium-ion batteries manufactured with the cathode materials having a loose and porous middle layer prepared in Examples 1-13 not only have high first charge-discharge capacity, first efficiency, and rate capability but also exhibit high capacity retention rate.

Further, the characteristics r1/R, r2/R of the cathode materials prepared in Example 1-2 fall within the preferred ranges of the present disclosure, so that the charge-discharge capacity, first efficiency, rate capability, and capacity retention rate of the lithium-ion batteries assembled with the cathode materials are further improved.

In Example 13, although the capacity, first efficiency, and rate capability of the lithium-ion battery are improved, because the porosity of the middle layer is too high and the average pore diameter is excessively large, the material powder density is low and the porosity is too large, which result in the decreased structural strength of the middle layer and the deterioration of the capacity retention rate after charge-discharge cycles.

The cathode material prepared in Comparative Example 1 does not have the characteristic structure of the loose and porous middle layer of the present disclosure, the electrolyte infiltrates slowly, both the first efficiency and the capacity are low, the rate capability is poor; in addition, the secondary particles are broken because the volume is continuously changed and the structural stress is released in the repeated lithium de-intercalation/intercalation process, and the cycle life is poor.

Comparative Example 2 arranges that the inner core is too small, and the loose and porous middle layer is designed to be excessively thick, although the arrangement is beneficial to the first efficiency, capacity, and rate capability, while in the cycle test, the surface side reactions are too much, which results in rapid attenuation of capacity decay, and its low TD is not conducive to the actual use.

In Comparative Example 3, the middle layer is unduly close to the center of the secondary particles, which was not favorable for infiltration of the electrolyte, thus the first-cycle capacity, efficiency, and rate capability are poor.

Comparative Example 4 has a loose inner core with a smaller size, a densely packed middle layer, and a looser outer shell, and the denser middle layer is the main structure, the overall performance is better than that of Comparative Example 1, but is obviously inferior to that of Example 1.

In Comparative Example 5, the porosity of the middle layer porosity is too small, and the average pore diameter is small, thus the electrolyte infiltration is limited, and the capacity, first efficiency, and rate capability of the lithium-ion battery have deteriorated.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A cathode material, wherein the cathode material is composed of secondary particles agglomerated by primary particles; wherein individual secondary particle comprises an inner core structure, a middle layer, and a shell layer, in this order, along a direction from a center to a surface of the individual secondary particle; wherein the middle layer is distributed in a circular ring shape, and an inner radius r1 of the circular ring-shaped middle layer and a radius R of the secondary particle satisfy the following relation:

r1/R is more than 0.35 and less than 1;

wherein the secondary particle has a structure of close packing of an inner core structure, loose and porous middle layer, and close packing of the shell layer;

wherein a porosity of the middle layer is greater than or equal to 20%;

wherein an average pore diameter of the middle layer is less than or equal to 1 μm; and the porosity of the middle layer is determined by a ratio of a pore area in an annular area of the middle layer to a circular ring area of the middle layer in the scanning electron microscope (SEM) image showing a cross-section of the secondary particles of the cathode material;

wherein the cathode material has a composition represented by formula I:

formula I, wherein −0.1≤a≤0.2, 0.5≤x≤1, 0≤y≤0.5, 0≤z≤0.1, and x+y+z=1; M is at least one element selected from the group consisting of Mn, Al, Fe, and Mg; M' is at least one element selected from the group consisting of B, Mg, Al, Ca, Sr, Ba, Zr, Ti, Ce, Y, W, La, Nb, Ta, Zn, Co, and Mo; and wherein the cathode material is a lamellar cobalt-free cathode material.

2. The cathode material of claim 1, wherein the r1/R is within a range of 0.4-0.7;

and/or, the middle layer exhibits a reticulate loose and porous structure;

and/or, the porosity of said middle layer is within a range of 25-35%;

and/or, the average pore diameter of said middle layer is within a range of 300-500 nm.

3. The cathode material of claim 1, wherein an outer radius r2 of the circle ring-shaped middle layer and the radius R of the secondary particles satisfy the following relation:

$$0.5 < r2/R < 1;$$

and/or, r2/R−r1/R is within a range of 0.1-0.5.

4. The cathode material of claim 3, wherein the r2/R is within a range of 0.7-0.9;

and/or, r2/R−r1/R is within a range of 0.2-0.4.

5. The cathode material of claim 1, wherein the secondary particles have an average particle diameter $D_{50}$ within a range of 8-20 μm;

and/or, the primary particles of the inner core structure are closely packed in a spherical and/or spheroidal shape;

and/or, a length-diameter ratio L1 of the primary particles of the inner core structure satisfies: $1 \leq L1 \leq 2$;

and/or, the primary particles of the shell layer are radially and closely packed;

and/or, a length-diameter ratio L2 of the primary particles of the shell layer satisfies: $2.5 \leq L2 \leq 5$.

6. The cathode material of claim 1, wherein a length-diameter ratio L1 of the primary particles of the inner core structure satisfies: $1.2 \leq L1 \leq 1.8$;

and/or, wherein a length-diameter ratio L2 of the primary particles of the shell layer satisfies: $3 \leq L2 \leq 4$.

7. The cathode material of claim 1, wherein the primary particles of the cathode material have an average particle size within a range of 300-700 nm;

and/or, wherein a tap density TD of the cathode material is more than or equal to 2.5 g/cm³.

8. The cathode material of claim 7, wherein the primary particles of the cathode material have an average particle size within a range of 400-600 nm;

and/or, wherein the tap density TD of the cathode material is within a range of 2.5-3 g/cm³.

9. A method for preparing the cathode material of claim 1, comprising the following steps:

(1) mixing a nickel salt, an optional M salt, and an optional M' element-containing compound with a solvent to prepare a mixed salt solution, preparing a precipitant solution with a precipitant, and preparing a complexing agent solution with a complexing agent;

(2) introducing the mixed salt solution into a reaction kettle containing the precipitant solution and the complexing agent solution to carry out a co-precipitation reaction, in the presence of a protective atmosphere; the co-precipitation reaction comprising the following steps:

(2-1) controlling a temperature of the reaction system to be T1, carrying out a first-stage co-precipitation reaction until the median particle diameter $D_{50}$ of the co-precipitated particles reaches $D_1$, then stopping the introduction of the mixed salt solution;

(2-2) controlling the temperature of the reaction system to be T2, continuously introducing the mixed salt solution to perform a second-stage co-precipitation reaction until the median particle diameter $D_{50}$ of the co-precipitated particles reaches $D_2$, then stopping the introduction of the mixed salt solution;

(2-3) controlling the temperature of the reaction system to be T3, continuously introducing the mixed salt solution to perform a third-stage co-precipitation reaction until the median particle diameter $D_{50}$ of the co-precipitated particles reaches $D_3$, then stopping the introduction of the mixed salt solution;

(2-4) aging, separating, washing, and drying the co-precipitation slurry obtained in step (2-3) to obtain a cathode material precursor;

(3) blending a lithium source, the cathode material precursor, and an optional M' element-containing compound to obtain a mixture, sintering the mixture in the presence of an oxygen-containing atmosphere, then cooling, crushing, sieving the sintered product and removing iron thereof to prepare a cathode material;

wherein T1>T2, and/or 0.35<D1/D3<1.

10. The method of claim 9, wherein T1−T2 is larger than or equal to 15° C.;

and/or, D1/D3 is within a range of 0.4-0.7;

and/or, |T1−T3|≤5° C.;

and/or, 0.5<D2/D3<1;

and/or, D2/D3-D1/D3 is within a range of 0.1-0.5.

11. The method of claim 10, wherein T1−T2 is within a range of 15-40° C.;

and/or, |T1−T3| is within a range of 2-5° C.;

and/or, D2/D3 is within a range of 0.7-1;

and/or, D2/D3−D1/D3 is within a range of 0.2-0.4.

12. The method of claim 9, wherein the temperature T1 is within a range of 60-80° C.; the particle diameter D1 is within a range of 4-10 μm;

and/or, the temperature T2 is within a range of 40-60° C.; the particle diameter D2 is within a range of 6-18 μm;

and/or, the temperature T3 is within a range of 60-80° C.; the particle diameter D3 is within a range of 8-20 μm.

13. The method of claim 12, wherein the T1 is within a range of 65-75° C.; the particle diameter D1 is within a range of 5-9 μm;

and/or, the temperature T2 is within a range of 45-55° C.; the particle diameter D2 is within a range of 7-14 μm;

and/or, the temperature T3 is within a range of 65-75° C.; the particle diameter D3 is within a range of 9-16 μm.

14. The method of claim 9, wherein the nickel salt, the M salt, and the M' element-containing compound are used in an amount such that a molar ratio of n(Ni):n(M):n(M') is (0.5-1):(0-0.5):(0-0.1);

and/or, wherein the nickel salt and the M salt are each independently selected from the group consisting of sulfate salt, chloride salt, nitrate salt, acetate, and a combination thereof;

and/or, wherein the M' element-containing compound in step (1) is selected from the group consisting of sulfate of M', chloride of M', nitrate of M', acetate of M', and a combination thereof;

and/or, wherein the M' element-containing compound in step (3) is selected from the group consisting of oxide of M', hydroxide of M', oxyhydroxide of M', and a combination thereof;

and/or, wherein the solvent is selected from the group consisting of water, inorganic acid, alcohol, ether, amine, and a combination thereof;

and/or, wherein the precipitant is selected from the group consisting of sodium hydroxide, sodium carbonate, sodium bicarbonate, sodium oxalate, potassium hydroxide, potassium carbonate, potassium bicarbonate, potassium oxalate, and a combination thereof;

and/or, wherein the complexing agent is selected from the group consisting of ammonium hydroxide, ammonium sulfate, ammonium nitrate, ammonium chloride, salicylic acid, sulfosalicylic acid, ethylenediaminetetraacetic acid, and a combination thereof;

and/or, wherein the protective atmosphere is selected from the group consisting of nitrogen gas, argon gas, air, oxygen gas, and a combination thereof;

and/or, wherein pH values of the first-stage co-precipitation reaction, the second-stage co-precipitation reaction, and the third-stage co-precipitation reaction are independently within a range of 9-13;

and/or, wherein the lithium source, the cathode material precursor, and the M' element-containing compound are used in an amount such that $n(Li)/[n(Ni)+n(M)+n(M')]$ is within a range of (1-1.2):1;

and/or, the M' element-containing compound in step (1) and the M' element-containing compound in step (3) are used in an amount such that $n(M')/[n(Ni)+n(M)+n(M')]$ in said lamellar cobalt-free electrode material is within a range of 0-0.1;

and/or, wherein the oxygen-containing atmosphere is selected from oxygen gas and/or air;

and/or, wherein the sintering conditions comprising: a sintering temperature within a range of 600-1,000° C. and a sintering time within a range of 6-20 h.

15. A lithium ion battery comprising the cathode material of claim 1.

* * * * *